(12) United States Patent
Kim et al.

(10) Patent No.: US 6,590,851 B1
(45) Date of Patent: Jul. 8, 2003

(54) OPTICAL PICKUP FOR RECORDING/REPRODUCING OPTICAL DISCS OF MULTIPLE THICKNESSES

(75) Inventors: Tae-kyung Kim, Suwon (KR); Chong-sam Chung, Seongnam (KR); Young-man Ahn, Suwon (KR); Hea-jung Suh, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 215 days.

(21) Appl. No.: 09/690,021

(22) Filed: Oct. 17, 2000

(30) Foreign Application Priority Data

Jan. 14, 2000 (KR) .......................................... 2000-1782

(51) Int. Cl.⁷ ................................................ G11B 7/00
(52) U.S. Cl. ............................. 369/112.01; 369/112.13; 369/112.23; 369/44.23
(58) Field of Search ....................... 369/112.01, 112.02, 369/112.08, 112.13, 112.2, 112.23, 112.26, 44.14, 44.12, 44.23, 44.25, 44.37

(56) References Cited

U.S. PATENT DOCUMENTS 5,933,401 A * 8/1999 Lee et al. ............... 369/112.21
6,343,058 B1 * 1/2002 Akiyama et al. ........ 369/112.1

FOREIGN PATENT DOCUMENTS

| DE | 199 27 714 | 12/1999 |
|---|---|---|
| EP | 0 831 466 | 3/1998 |
| EP | 0 865 037 | 9/1998 |
| EP | 0 996 120 | 4/2000 |
| JP | 1-233411 | 9/1989 |
| JP | 5-81698 | 4/1993 |
| JP | 8184753 | 7/1996 |
| JP | 9-236745 | 9/1997 |
| JP | 11-110806 | 4/1999 |
| JP | 11-328719 | 11/1999 |
| JP | 2000-82232 | 3/2000 |
| JP | 2000-195087 | 7/2000 |

OTHER PUBLICATIONS

Yamamoto et al., "0.8–NA two element objective lens for the optical disk" Japanese Journal of Applied Physics, Publication Office Japanese Journal of Applied Physics. Tokyo, Japan. vol. 36, No. 1B, 1997, pp. 456–459.

* cited by examiner

*Primary Examiner*—Muhammad Edun
(74) *Attorney, Agent, or Firm*—Staas & Halsey LLP

(57) ABSTRACT

An optical pickup including: first and second light sources for generating first and second laser beams having different wavelengths corresponding to first and second media having different thicknesses, respectively; an objective lens that has diverging and converging/focusing portions, to focus the first and second laser beams from the first and second light sources onto the first and second media, respectively; a photodetector to receive the first and second laser beams that are emitted from the first and second light sources and reflected, respectively, by the first and second media; and a collimating lens arranged on the optical path between the objective lens, and the first and second light sources. The optical pickup is compatible with both existing digital versatile disks (DVDs), and high-definition (HD)-DVDs, which need a blue light source near 405 nm and an objective lens that has a numerical aperture of 0.6 or more.

47 Claims, 11 Drawing Sheets

OPTICAL PICKUP FOR RECORDING/ REPRODUCING OPTICAL DISCS OF MULTIPLE THICKNESSES

CROSS-REFERENCE TO RELATED APPLICATIONS

This application claims the benefit of Korean Application No. 00-1782, filed Jan. 14, 2000, in the Korean Industrial Property Office, the disclosure of which is incorporated herein by reference.

BACKGROUND OF THE INVENTION

1. Field of the Invention

The present invention relates to an optical pickup for high-density information writing and reading systems, and more particularly, to an optical pickup capable of reducing chromatic aberration that occurs when a blue light source is employed.

2. Description of the Related Art

In optical writing and reading systems, the recording density is determined by the size of the focused spot. In general, the size of the focused spot (S) is proportional to the wavelength ($\lambda$), and inversely proportional to the numerical aperture (NA), as expressed by formula (1):

$$S \propto \lambda/NA \qquad (1)$$

For a higher recording density than that for compact disks (CDs) or digital versatile disks (DVDs), the size of the spot being focused on an optical disk must be further reduced. To reduce the spot size, as can be inferred from formula (1), the wavelength ($\lambda$) of a laser beam must be reduced and the NA of an objective lens must be increased. Thus, for high density information recording, a laser beam that has a short wavelength, such as a blue laser, must be employed as a light source and the NA of the objective lens must be maintained at 0.6 or more.

On the other hand, coma aberration ($W_{31}$), which occurs due to a tilting of the optical disk, is associated with the tilt angle ($\theta$) of the disk, the refractive index (n) of the disk substrate, the thickness (d) of the disk substrate, and the NA of the objective lens, as expressed by formula (2):

$$W_{31} = -\frac{d}{2} \cdot \frac{n^2(n^2-1)\sin\theta\cos\theta}{(n^2-\sin^2\theta)^{5/2}} NA^3 \qquad (2)$$

To ensure an allowable coma aberration $W_{31}$ with respect to the tilt of disk for high density recording, there is a tendency to reduce the thickness (d) of the disk substrate. For example, CDs have a thickness of 1.2 mm, and DVDs have a thickness of 0.6 mm. Also, it is likely that the thickness of high-definition DVDs (HD-DVDs), which are recently being developed, will be 0.6 mm or less. In using such thin optical disks for high density recording, the first consideration is the compatibility with existing disks including CDs and DVDs. However, for DVD-recordable (DVD-R) and multi-layered DVDs, it is necessary to use a red light source because of the low reflectivity of these disks with respect to short wavelength light. Therefore, a red light source is used for these disks. With regard to the objective lens, by applying a technique capable of correcting both chromatic aberration caused by the different wavelengths of the light sources, and spherical aberration caused by the difference in thickness of the disks, it is possible to use a common objective lens for both existing disks and HD-DVDs.

For an optical pickup for 0.6 mm-thick DVDs, which uses a red light source and an objective lens that has an NA of 0.6, in order to be compatible with 1.2 mm-thick CDs, an additional light source that has a wavelength of 650 nm and an objective lens are employed in the optical pickup using various techniques. These techniques include an annular shielding technique for blocking light passing through the intermediate area between a far axis and near axis areas, a method of controlling the NA of the objective lens by using liquid crystal (LC) shutters, and a method of splitting light using a hologram optical member to form individual focuses onto two disks that have different thicknesses. However, for compact disk recordables (CD-Rs), reflectivity with respect to red light sharply drops, and thus a light source that has a wavelength of 780 nm is necessary. For this reason, use of a DVD indefinite/CD definite optical system providing compatibility between light beams of 780 nm and 650 nm, or use of an annular objective lens that has an annular focus region between the near axis and far axis regions has been suggested. In particular, for a CD definite optical system, the NA of the objective lens is limited and divergent rays are incident on the objective lens, thereby correcting an aberration caused by thickness variations of disks and the objective lens.

As previously described, an optical pickup using a short wavelength light source is required for higher density information writing and reading than DVD systems are capable of. As an example, for an optical pickup for HD-DVDs, a laser that has a wavelength shorter than 650 nm (as used for DVDs) is required as a light source. In addition, refractivity of optical material for an optical disk varies sharply at wavelengths shorter than 650 nm, thereby causing excessive aberration. Thus, there is a need for an optical system capable of both effectively reducing the chromatic aberration, and being compatible with existing DVDs.

For a DVD-R, the reflectivity with respect to light sources other than a red light source decreases. Thus, for the compatibility with DVD-Rs, a light source that has a wavelength of 650 nm must be used. However, the aberration problem cannot be eliminated from a 400 nm-objective lens just by controlling the degree of divergence of the incident light, which is emitted from the 650 nm-light source and is incident on the objective lens. Thus, a major concern in searching HD-DVDs is an effective chromatic aberration correction technique.

According to a conventional method for correcting aberration, as shown in FIG. 1, an aberration correcting lens 3 is interposed between an optical disk 1 and an objective lens 3. Alternatively, as shown in FIG. 2, a wavelength selecting member 4, which defines the NA of the objective lens 2 depending on the wavelength of light, is located between the objective lens 2 and the light source (not shown). For the optical pickup shown in FIG. 1, the spherical aberration is corrected by adjusting the distance between the two lenses according to the thickness variation of the optical disk 1. For the optical pickup shown in FIG. 2, the NA of the objective lens 2 with respect to light that has a longer wavelength is limited by the wavelength selecting member 4, and its optical elements are arranged such that the light from light sources is divergently incident on the objective lens 2, thereby correcting spherical aberration due to the thickness variation of optical disks.

However, the conventional optical pickup shown in FIG. 1 needs to precisely control the distance between the objective lens 2 and the aberration correcting lens 3. Thus, an additional actuator is required to accurately control the distance between the two lenses 2 and 3, and between lens 3 and the disk. This solution complicates the manufacture of the optical pickup, and thus increases the cost. In addition, for the conventional optical pickup shown in FIG. 2, because a divergent light is used, axial distortion of the objective lens with respect to the disks causes distortion of a tracking error.

SUMMARY OF THE INVENTION

To solve the above problems, it is an objective of the present invention to provide an optical pickup that uses laser beams each that have different wavelengths, and is compatible with different types of optical recording media.

It is another objective of the present invention to provide an optical pickup that is capable of being assembled easily with a simple structure, and is compatible with different types of optical recording media.

It is still another objective of the present invention to provide an optical pickup that is capable of being manufactured at low cost, and is compatible with different types of optical recording media.

Additional objects and advantages of the invention will be set forth in part in the description which follows and, in part, will be obvious from the description, or may be learned by practice of the invention.

The objectives of the present invention are achieved by an optical pickup comprising: first and second light sources to generate laser beams, which have different wavelengths, corresponding to first and second media that have different thicknesses, respectively; an objective lens, which has diverging and focusing portions, to focus the laser beams from the first and second light sources onto the first and second media, respectively; at least one photodetector to receive the laser beams that are emitted from the first and second light sources and reflected, respectively, by the first and second media; and a collimating lens arranged on the optical path between the objective lens, and the first and second light sources.

Preferably, assuming that the front focal lengths of the diverging and condensing portions of the objective lens are f1 and f2, respectively, and the Abbe's numbers on the d-line of the optical materials for the diverging and condensing portions of the objective lens are v1 and v2, respectively, the objective lens satisfies the relationship $0<1/(f1 \cdot v1)+1/(f2 \cdot v2)<0.005$.

Preferably, assuming that the focal length of the entire objective lens is f and the focal length of the diverging portion is fn, the objective lens satisfies the relationship $-0.8<f/fn<0$.

Preferably, one surface of the objective lens is an aspheric plane, and the photodetector receives the laser beams originating from both the first and second light sources.

Preferably, the first light source generates a blue laser beam, and more preferably, has a wavelength of 405 nm, and the second light source generates a red laser beam, and more preferably, has a wavelength of 650 nm. Preferably, the substrate of the first medium has a thickness less than 0.6 mm and the substrate of the second medium has a thickness of 0.6 mm.

BRIEF DESCRIPTION OF THE DRAWINGS

The above objectives and advantages of the present invention will become more apparent by describing, in detail, the embodiments thereof with reference to the attached drawings, in which.

DETAILED DESCRIPTION OF THE PREFERRED EMBODIMENTS

Figure 1:
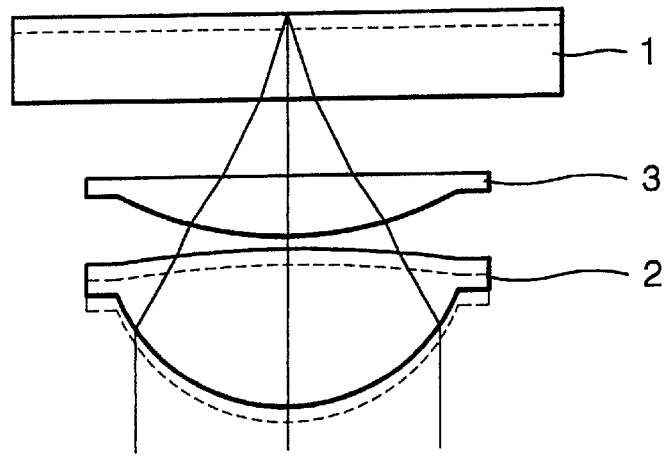
FIG. 1 illustrates the objective lens of a conventional optical pickup.
Figure 2:
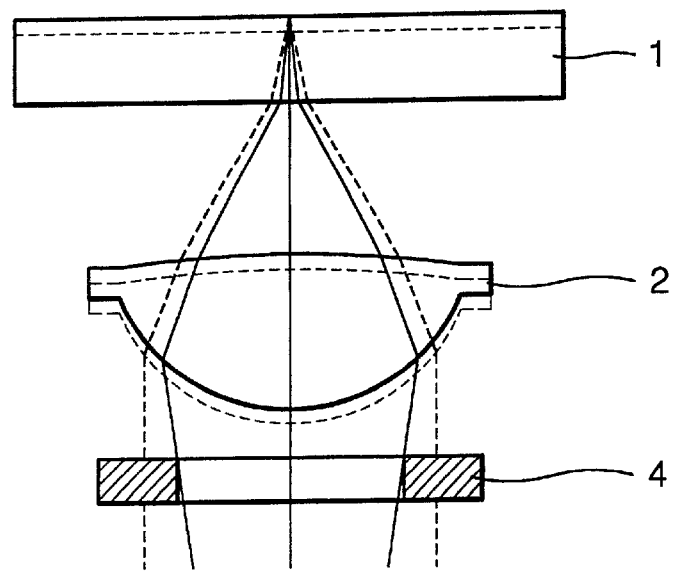
FIG. 2 illustrates the objective lens of another conventional optical pickup.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
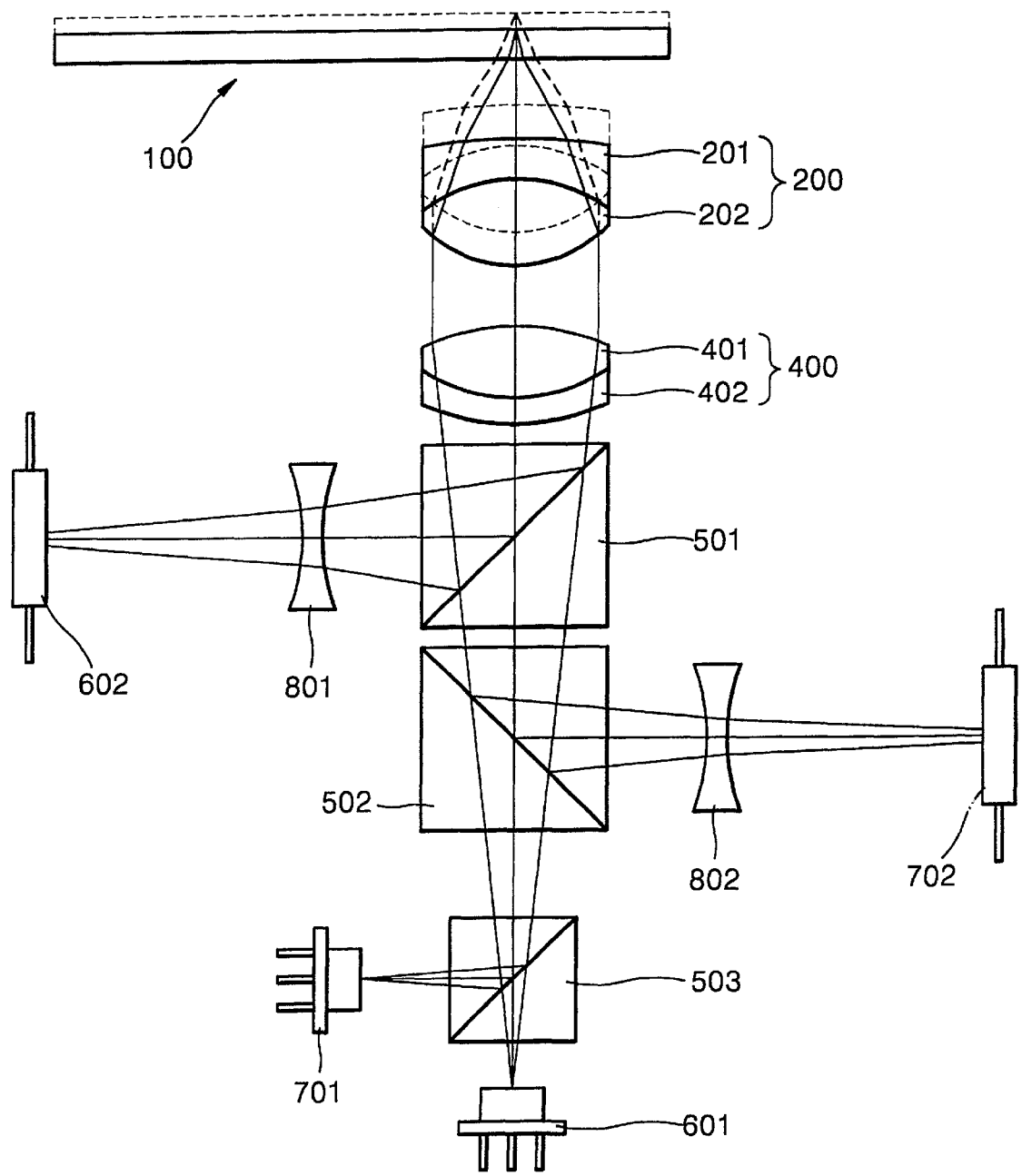
FIG. 3 shows the optical arrangement of a first embodiment of an optical pickup according to the present invention.

A first embodiment of an optical pickup according to the present invention is shown in FIG. 3. A first light source 601 is positioned at the end of the optical axis of an objective lens 200 that faces a medium (optical disk) 100. A collimating lens 400, and first, second, and third beam splitters 501, 502 and 503 are sequentially arranged on the optical path between the objective lens 200 and the first light source 601. The collimating lens 400 includes a positive lens 401 with condensing power and a negative lens 402 with diverging power.

The third beam splitter 503 transmits the laser beam from the first light source 601 and reflects the laser beam from a second light source 701 toward the medium 100. As shown in FIG. 3, the second light source 701 is arranged on the optical path of the light reflected from the third beam splitter 503.

The second beam splitter 502 transmits the laser beams from the first and second light sources 601 and 701, and reflects the light reflected from the medium 100 that originated from the second light source 701. The light reflected by the medium 100 and in turn by the second beam splitter 502 is condensed by a second condensing lens 802 onto a second photodetector 702.

The first beam splitter 501 transmits all of the laser beams from the first and second light sources 601 and 701. Also, the first beam splitter 501 reflects the light reflected by the medium 100, which is originated from the first light source 601, and transmits the light reflected by the medium 100 which originated from the second light source 701. The light reflected by the medium 100 and in turn by the first beam splitter 501 is condensed by a first condensing lens 801 onto a first photodetector 602.

The collimating lens 400 collimates the laser beams from the first and second light sources 601 and 701, and the collimated laser beams are incident on the medium 100 through the objective lens 200.

The objective lens 200 is a doublet lens including a positive portion 202 with a condensing/focusing power, and a negative portion 201 with a diverging power. Assuming that the focal length of the objective lens 200 is f and the focal length of the negative portion 201 is fn, the objective lens 200 satisfies the relationship $-0.8 < f/fn < 0$.

Also, assuming that the front focal lengths of the negative and positive portions 201 and 202 of the objective lens 200 are f1 and f2, respectively, and the Abbe's numbers on the d-line of the optical materials for the negative and positive portions 201 and 202 are v1 and v2, respectively, the objective lens 200 satisfies the relationship $0 < 1/(f1 \cdot v1) + 1/(f2 \cdot v2) < 0.005$. In addition, one surface of the objective lens 200 is an aspheric plane.

Figure 4:
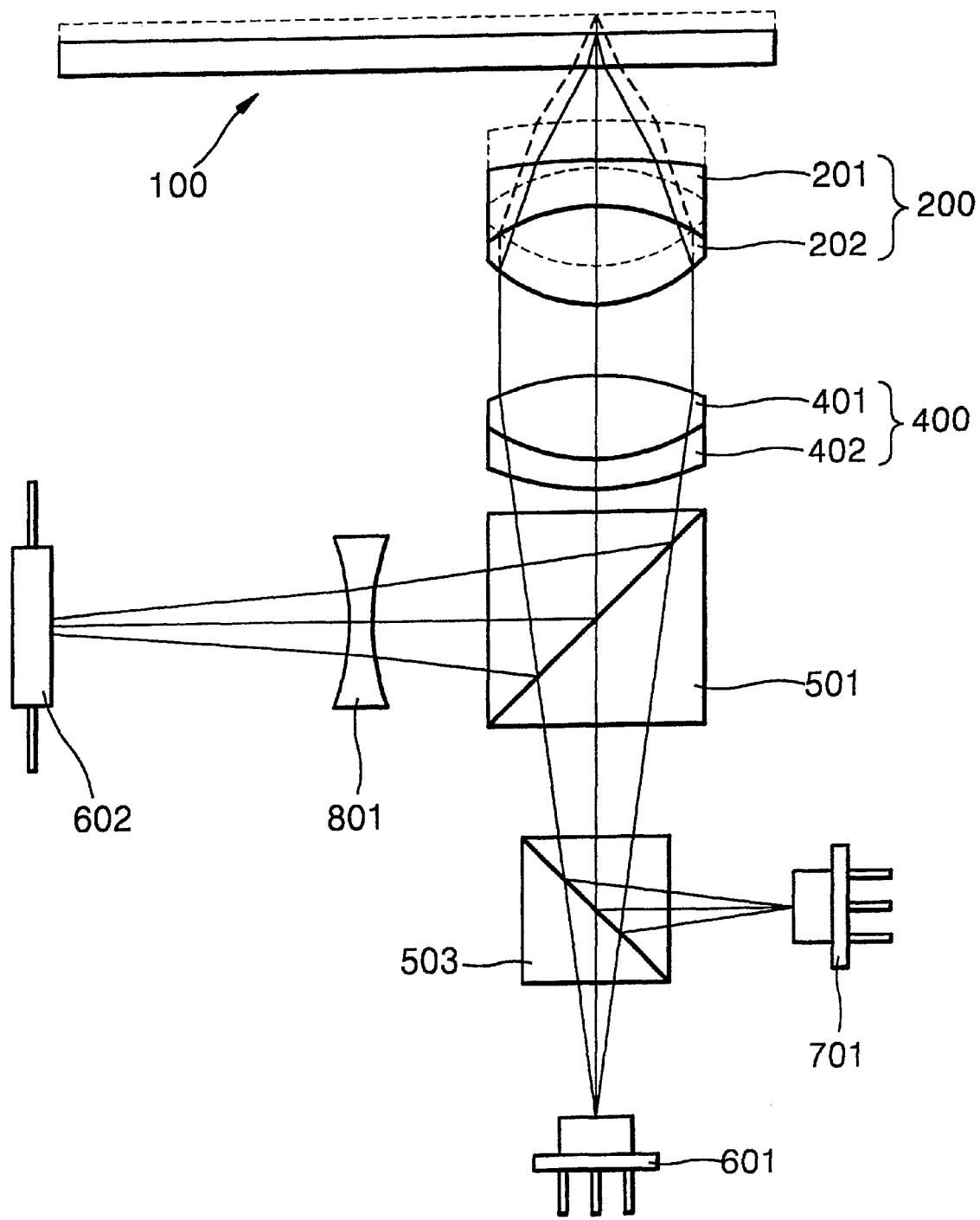
FIG. 4 shows the optical arrangement of a second embodiment of an optical pickup according to the present invention.

A second embodiment of the optical pickup according to the present invention is shown in FIG. 4. A first light source 601 is positioned at the end of the optical axis of an objective lens 200 that faces a medium 100. First and third beam splitters 501 and 503 are arranged between the objective lens 200 and the first light source 601. The beam splitters 501 and 503 are separated by a predetermined distance from each other. A collimating lens 400, including a positive lens 401 with a condensing power and a negative lens 402 with a diverging power, is arranged between the objective lens 200 and the first beam splitter 501.

The collimating lens 400 collimates laser beams from the first and second light sources 601 and 701, and the collimated laser beams are incident on the medium 100 through the objective lens 200.

The third beam splitter 503 transmits the laser beam from the first light source 601 and reflects the laser beam from the second light source 701 toward the medium 100. As shown in FIG. 4, the second light source 701 is arranged on the optical path of the light reflected by the third beam splitter 503.

The first beam splitter 501 transmits the laser beams from the first and second light sources 601 and 701, and reflects the light reflected by the medium 100. The light reflected by the medium 100 and in turn by the first beam splitter 501 is condensed by a condensing lens 801 onto a photodetector 602.

As in the first embodiment, the objective lens 200 is a doublet lens including a positive portion 202 with a condensing/focusing power, and a negative portion 201 with a diverging power. Assuming that the focal length of the objective lens 200 is f and the focal length of the negative portion 201 is fn, the objective lens 200 satisfies the relationship $-0.8 < f/fn < 0$. In addition, one surface of the objective lens 200 is an aspheric plane.

Also, assuming that the front focal lengths of the negative and positive portions 201 and 202 of the objective lens 200 are f1 and f2, respectively, and the Abbe's numbers on the d-line of the optical materials for the negative and positive portions 201 and 202 are v1 and v2, respectively, the objective lens 200 satisfies the relationship $0 < 1/(f1 \cdot v1) + 1/(f2 \cdot v2) < 0.005$.

In the first and second embodiments discussed above, a wavelength selecting filter may also be placed between the objective lens 200 and the collimating lens 400. The wavelength selecting filter is employed if there is a need for separately controlling the NA of the objective lens 200 with respect to the laser beams generated from the first and second light sources 601 and 701. For example, if the first light source 601 emits a blue laser beam of 405 nm and needs the objective lens 200 to have an NA of 0.7, and if the second light source 701 emits a red laser beam of 650 nm and needs the objective lens 200 to have an NA of 0.6, the wavelength selecting filter could be used to allow a reduction of the NA of the objective lens 200 to 0.6 for the red laser beam of 650 nm, while transmitting all of the blue laser beam of 405 nm.

Table 1 shows the design data for an optical pickup, which uses a blue laser beam of 405 nm and includes a disk that has a 0.4 mm-thick substrate.

TABLE 1

| Surface | Curvature Radius | Thickness | Name of Glass |
|---|---|---|---|
| Object Surface | Infinity | 0.000000 | |
| s1 | Infinity | 0.250000 | BK7 |
| s2 | Infinity | 16.26320 | |
| s3 | Infinity | 6.000000 | BK7 |
| s4 | Infinity | 3.000000 | |
| s5 | 99.276000 | 1.000000 | FD4 |
| s6 | 13.400000 | 2.000000 | BAF10 |
| s7 | −17.230000 | 5.000000 | |
| s8 | 2.249482 | 2.000000 | BACD5 |
| | K: −1.099197 | | |
| | A: 0.540411E-0.2 B: −0.113820E-03 | | |
| | C: 0.266830E-04 D: −0.287691E-04 | | |
| | E: 0.502346E-05 F: −0.541172E-06 | | |
| s9 | −13.997487 | 0.800000 | FEL1 |
| s10 | Infinity | 1.508124z1 | |
| s11 | Infinity | 0.400000z2 | 'CG' |
| s12 | Infinity | 0.000000 | |
| Image Surface | Infinity | 0.000000 | |

Equation of Aspheric Surface (See Formula(3))

| | |
|---|---|
| Refractive Index/Abbe's Number on d-line, v | BACD: 1.605256/61.3 |
| | FEL1: 1.568949/45.8 |
| | FD4: 1.805793/27.5 |
| | BAF10: 1.694714/47.2 |
| | BK7: 1.530196/64.2 |
| | 'CG': 1.621462/31.0 |
| Diameter of Entrance Pupil (mm) | 3.96 |
| Wavelength (nm) | 405 |
| Focal Distance of Collimating Lens at Negative/Positive Portions, fc1/fc2 (mm) | −19.325/11.149 |
| Focal Distance of Combined Collimating Lens, fc (mm) | 24.994 |
| $\Sigma 1/(fi \cdot vi)$ | 0.0002 |
| fc/fc1 | −1.293 |
| Focal Distance of Objective Lens at Negative/Positive Portions, fo1/fo2 (mm) | 2.491/−7.009 |
| Focal Distance of Combined Objective Lens, fo (mm) | 3.352 |
| $\Sigma 1/(fi \cdot vi)$ | 0.0034 |
| fo/fo1 | −0.478 |
| Thickness at 650 nm | z1: 1.451248 |
| | z2: 0.6000000 |

$$z = \frac{ch^2}{1 + \sqrt{1-(1+k)c^2h^2}} + Ah^4 + Bh^6 + Ch^8 + Dh^{10} + Eh^{12} + Fh^{14} \quad (3)$$

where z is depth from the vertex of the surface, h is distance from the optical axis, c is curvature, K is a conic coefficient, and A, B, C and D are aspheric coefficients.

Figure 5:
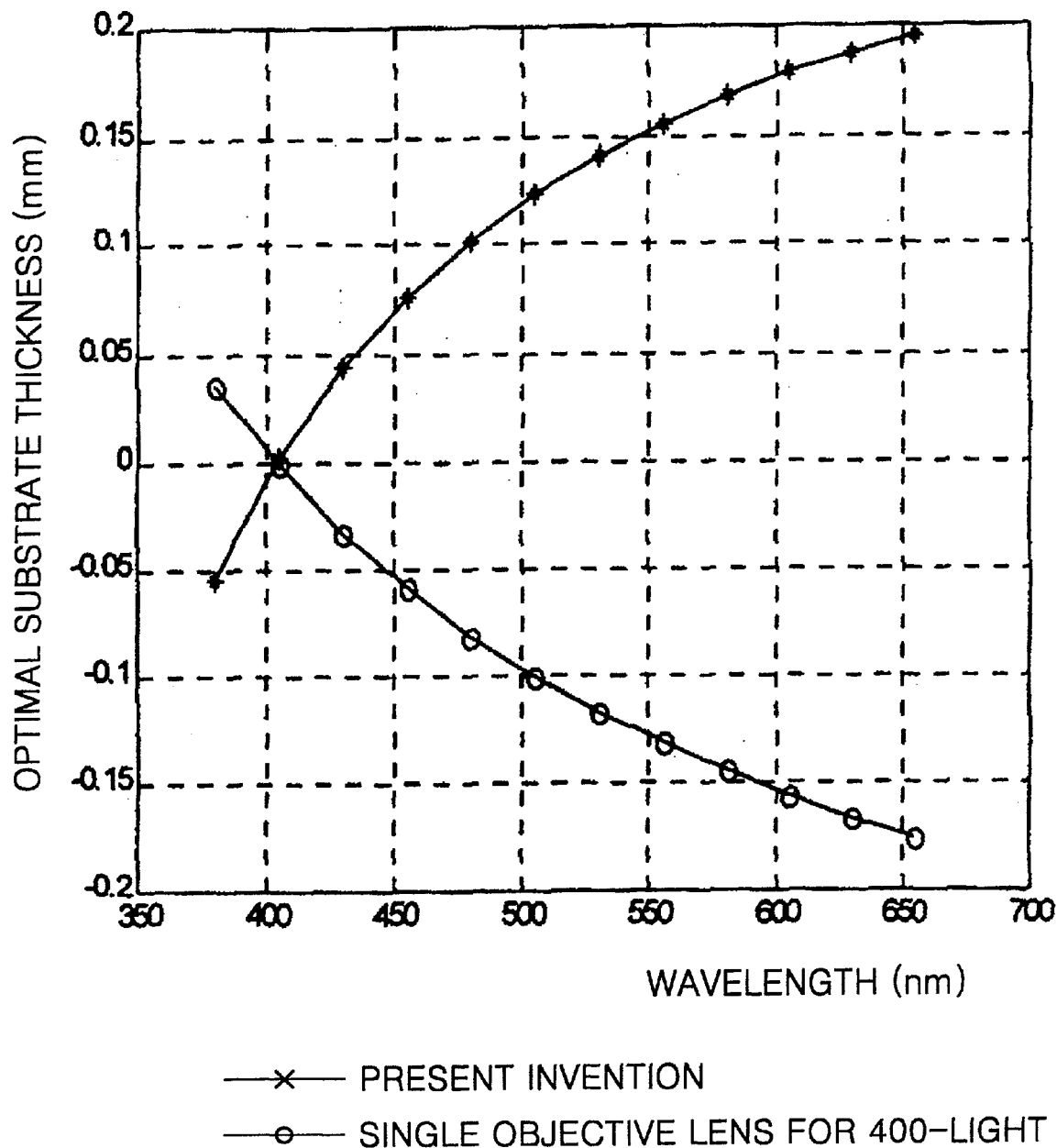
FIG. 5 is a graph comparing the variation of optimal thickness of a disk substrate for the inventive optical pickup and a conventional optical pickup, with respect to the variation of light wavelength.

FIG. 5 is a graph comparing the change in the optimal disk substrate thickness according to the variation of wavelength for a conventional single objective lens 2 shown in FIG. 1 and the doublet objective lens 200 shown in FIGS. 3–4 where the objective lens 200 is designed based on the data of Table 1. For the conventional single objective lens 2, the optimal thickness of the substrate tends to decrease with an increase in wavelength in order to correct the chromatic aberration. From FIG. 5, when a single objective lens 2 for a wavelength of 405 nm and a 0.4 mm-thick substrate is employed, the chromatic aberration at a wavelength of 650 nm can be eliminated at a substrate thickness of 0.23 mm. Thus, when reading data from a DVD which has a thickness of 0.6 mm, the chromatic aberration corresponding to the thickness variation (0.4−0.23=0.17 mm) and the spherical aberration corresponding to (0.6−0.4=0.2 mm) will occur. To correct this aberration, the thickness of a HD-DVD must be increased to 0.77 mm (0.6 mm+0.17 mm). However, this result goes against a tendency of reducing the thickness of disks for high density recording.

Figure 6:
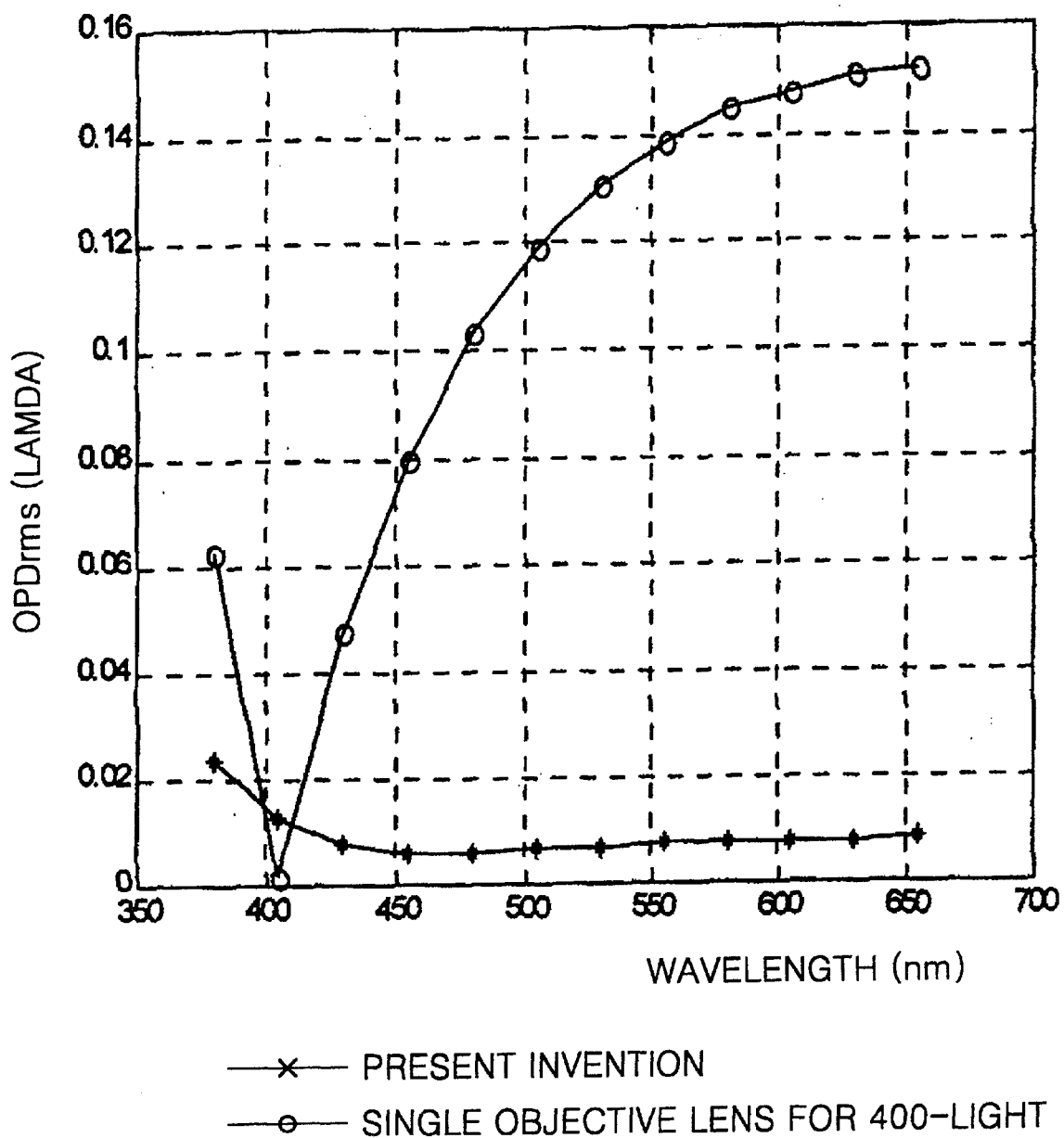
FIG. 6 is a graph comparing the variation of aberration for the inventive optical pickup and a conventional optical pickup, with respect to the variation of light wavelength.

FIG. 6 compares the change in aberration according to the variation of wavelength for a conventional single objective lens 2 and the doublet objective lens 200 according to the present invention, which is designed to correct the chromatic aberration. FIG. 6 indicates that the doublet objective lens 200 can reduce the chromatic aberration by the variation of wavelength to a level of OPD $0.015\lambda_{rms}$ of less.

The degree of defocus on the medium according to the wavelength variation for writing and reading operations is inversely proportional to $NA^2$, and the focal depth, $\pm\lambda/2NA^2$, is 0.563 $\mu$m. For the conventional objective lens 2, the defocus with respect to a wavelength variation of ±1 nm is 0.7 $\mu$m, which is beyond the range of the focal depth. Meanwhile, the defocus with respect to a wavelength variation of ±1 nm is 0.45 $\mu$m for the doublet objective lens 200, which is within the range of the focal depth.

Figure 7A:
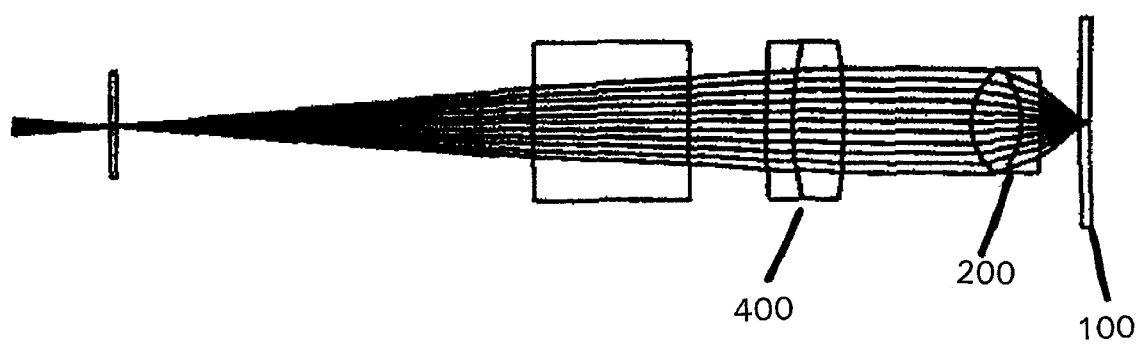
FIG. 7A illustrates the optical path of light that has a wavelength of 405 nm in the optical pickup according to the present invention.
Figure 7B:
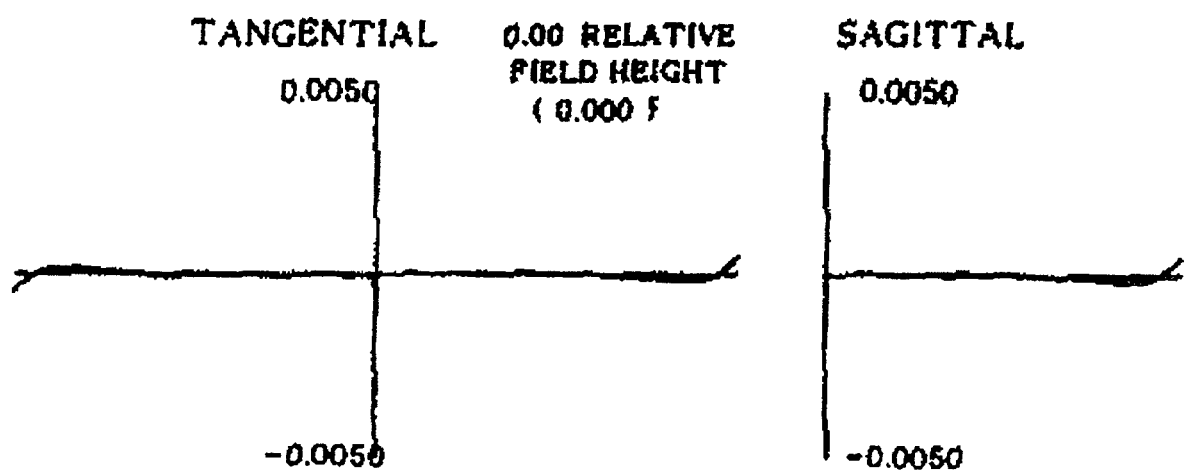
FIG. 7B illustrates the aberration with respect to light that has a wavelength of 405 nm in the optical pickup according to the present invention.
Figure 7C:
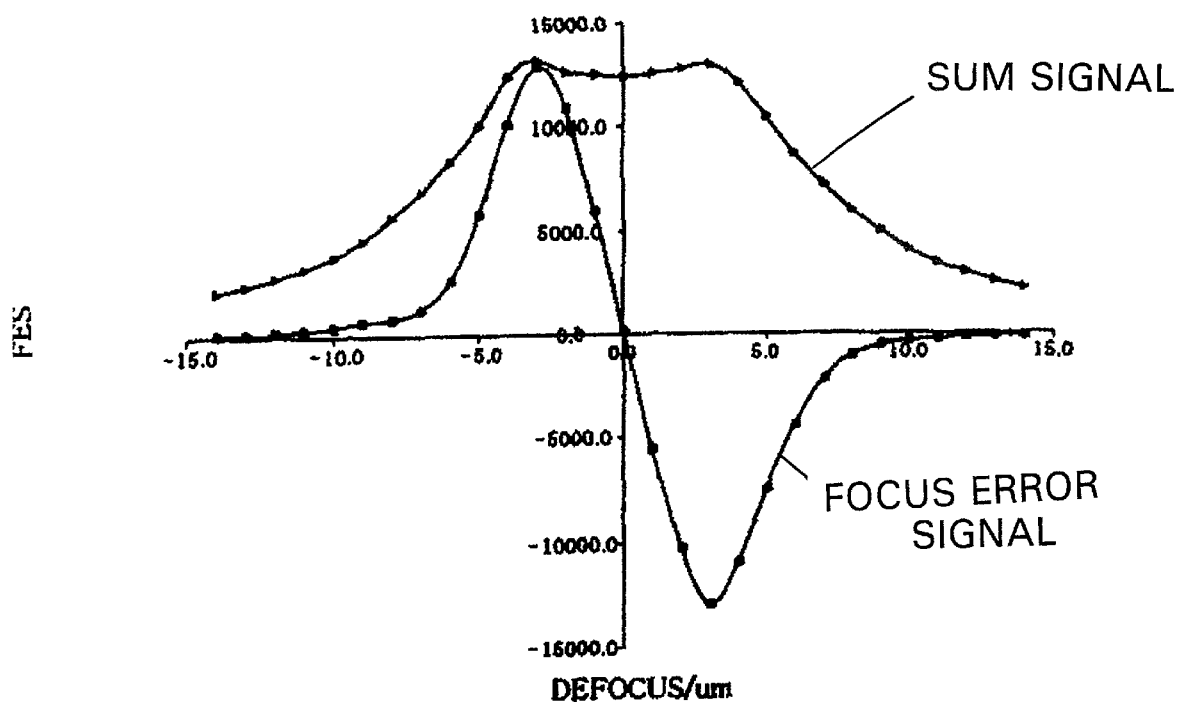
FIG. 7C illustrates the focus error signal for light that has a wavelength of 405 nm in the optical pickup according to the present invention.

FIG. 7A illustrates the optical path of the blue laser beam that has a wavelength of 405 nm incident on a disk 100 that has a 0.4 mm-thick substrate in an optical system designed with the specifications in Table 1. FIG. 7B shows the aberration occurring in the optical system of FIG. 7A, and FIG. 7C shows a focus error signal obtained by astigmatism in the optical system of FIG. 7A.

Figure 8A:
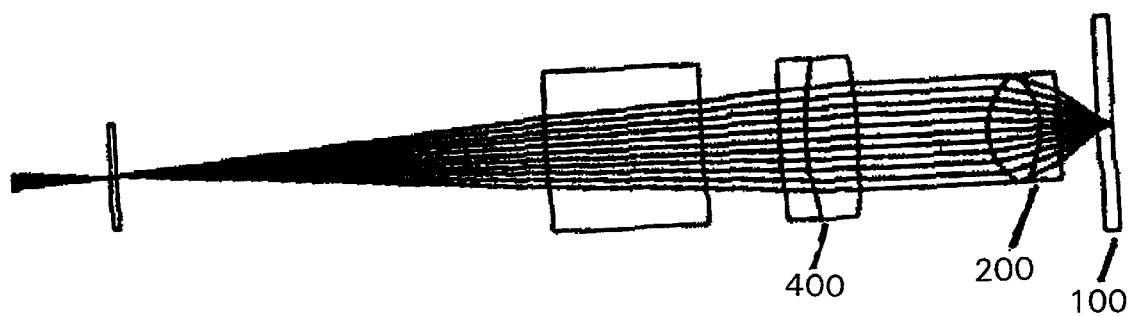
FIG. 8A illustrates the optical path of light that has a wavelength of 650 nm in the optical pickup according to the present invention.
Figure 8B:
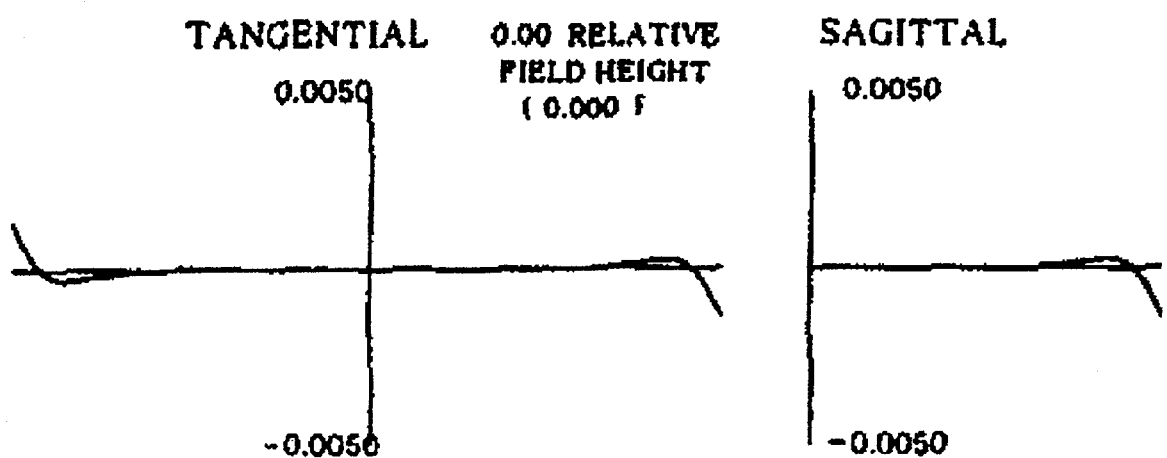
FIG. 8B illustrates the aberration with respect to light that has a wavelength of 650 nm in the optical pickup according to the present invention.
Figure 8C:
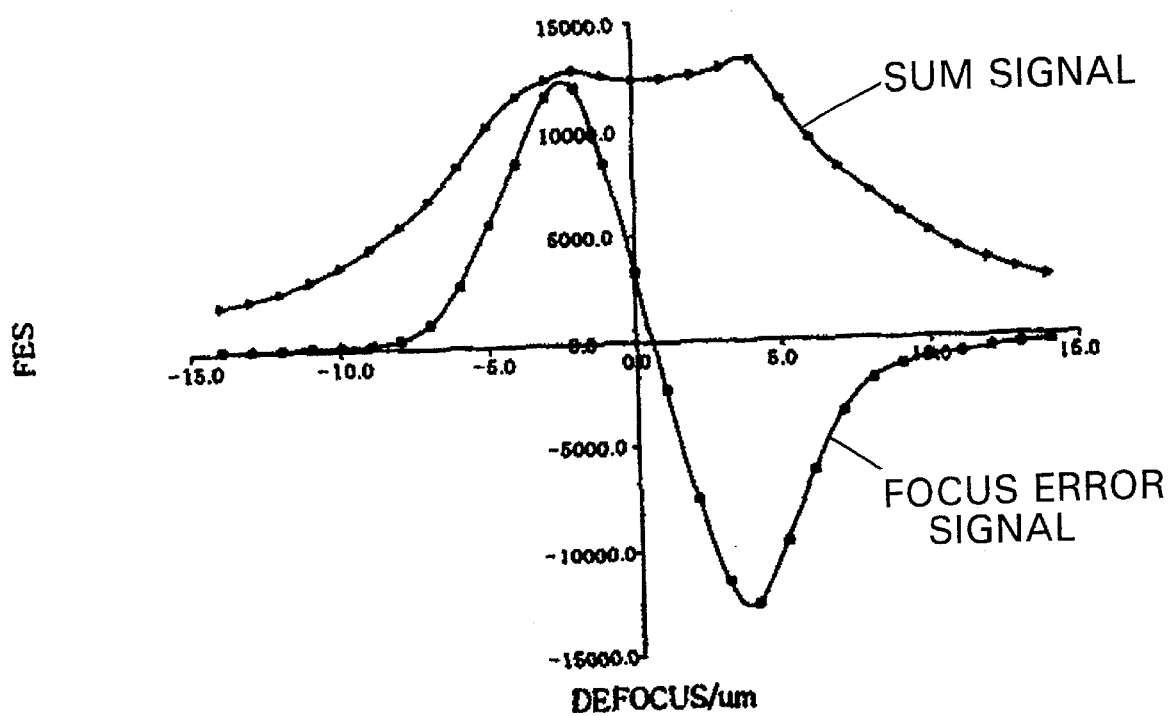
FIG. 8C illustrates the focus error signal for light that has a wavelength of 650 nm in the optical pickup according to the present invention.

FIG. 8A illustrates the optical path of the red laser beam that has a wavelength of 650 nm incident on a disk that has a 0.6 mm-thick substrate in the optical system designed with the data shown in Table 1. FIG. 8B shows the aberration occurring in the optical system of FIG. 8A, and FIG. 8C shows the focus error signal detected by astigmatism in the optical system of FIG. 8A. As shown in FIG. 8C, an offset of about 0.5 $\mu$m or more occurs, which is possibly corrected using appropriate signal processing circuits. This result shows that one photodetector can be used for both types of disks as illustrated in the second embodiment.

Table 2 shows the design data for a conventional doublet collimating lens for light of 650 nm, which has a focal distance of 25 mm. As shown in Table 2, the total-to-negative diverging power ratio of the conventional collimating lens is close to −1. In view of the ratio of the collimating lens 400 according to the present invention, which is shown to be −1.29 in Table 1, the collimating lens 400 according to the present invention has considerably stronger diverging power. Meanwhile, the diverging power of the objective lens 200 is relative weak at 0.48.

TABLE 2

| Surface | Curvature Radius | Thickness | Name of Glass |
|---|---|---|---|
| Object Surface | Infinity | Infinity | |
| s1 | 14.800000 | 1.7 | BAF3 |
| s2 | −13.480000 | 1.3 | SF11 |
| s3 | −48.995000 | 3.5 | |
| s4 | Infinity | 6.000000 | BK7 |
| s5 | Infinity | 16.025691 | |
| s6 | Infinity | 0.000000 | |
| Image Surface | Infinity | 0.000000 | |
| Refractive Index/Abbe's Number on d-line, v | | BAF3: 1.579229/46.5 SF11: 1.776662/25.8 BK7: 1.514520/64.2 | |
| Wavelength (nm) | | 650 | |
| Focal Distance of Collimating Lens at Negative/Positive Portions, fc1 and fc2 (mm) | | 12.454/−24.333 | |
| Focal Distance of Combined Collimating Lens, fc (mm) | | 25.000 | |
| Σ1/(fc · fi · vi) | | 0.00013 | |
| fc/fc2 | | −1.027 | |

The optical pickup according to the present invention is compatible for both existing DVDs, and HD-DVDs, which employ a blue light source near 405 nm and an objective lens that has an NA of 0.6 (note that the specification thereof is not standardized yet). In particular, the optical pickup can achieve the dual-compatibility by using only one objective lens and one photodetector. Also, because the optical pickup according to the present invention has a simple structure, it can be easily manufactured at reduced cost. In addition, the defocusing according to wavelength variation during high-density writing and reading operations can be suppressed within the range of focal depth, which enables high quality signal reproduction.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An optical pickup comprising:
   first and second light sources to generate laser beams having different wavelengths, wherein the wavelengths correspond to first and second media having different thicknesses, respectively;
   an objective lens comprising diverging and focusing portions, wherein the diverging portion divergently transmits and the focusing portion focuses the laser beams from said first and second light sources onto the first and second media, respectively;
   at least one photodetector to receive the laser beams emitted from said first and second light sources and reflected, respectively, by the first and second media; and
   a collimating lens arranged on an optical path between said objective lens, and said first and second light sources.

2. The optical pickup of claim 1, wherein said objective lens satisfies the relationship 0<1/(f1·v1)+1/(f2·v2)<0.005, where
   f1 and f2 are the front focal lengths of the diverging and focusing portions, and
   v1 and v2 are the Abbe's numbers on the d-line of the optical materials for the diverging and focusing portions.

3. The optical pickup of claim 2, wherein said objective lens satisfies the relationship −0.8<f/fn<0, where
f is the focal length of said objective lens, and
fn is the focal length of the diverging portion.

4. The optical pickup of claim 2, wherein one surface of said objective lens comprises an aspheric plane.

5. The optical pickup of claim 2, wherein said at least one photodetector comprises one photodetector that receives the laser beams originating from both said first and second light sources.

6. The optical pickup of claim 2, wherein said first light source generates a blue laser beam and said second light source generates a red laser beam.

7. The optical pickup of claim 2, wherein a substrate of the first medium has a thickness less than 0.6 mm, and a substrate of the second medium has a thickness of 0.6 mm.

8. The optical pickup of claim 1, wherein said objective lens satisfies the relationship −0.8<f/fn<0, where
f is the focal length of said objective lens, and
fn is the focal length of the diverging portion.

9. The optical pickup of claim 8, wherein said at least one photodetector comprises one photodetector that receives the laser beams originating from both said first and second light sources.

10. The optical pickup of claim 9, wherein said first light source generates a blue laser beam and said second light source generates a red laser beam.

11. The optical pickup of claim 9, wherein a substrate of the first medium has a thickness less than 0.6 mm, and a substrate of the second medium has a thickness of 0.6 mm.

12. The optical pickup of claim 8, wherein said first light source generates a blue laser beam and said second light source generates a red laser beam.

13. The optical pickup of claim 12, wherein said first light source generates a laser beam having a wavelength of 405 am and said second light source generates a laser beam having a wavelength of 650 nm.

14. The optical pickup of claim 13, wherein a substrate of the first medium has a thickness less than 0.6 mm, and a substrate of the second medium has a thickness of 0.6 mm.

15. The optical pickup of claim 12, wherein a substrate of the first medium has a thickness less than 0.6 mm, and a substrate of the second medium has a thickness of 0.6 mm.

16. The optical pickup of claim 8, wherein a substrate of the first medium has a thickness less than 0.6 mm, and a substrate of the second medium has a thickness of 0.6 mm.

17. The optical pickup of claim 1, wherein one surface of said objective lens comprises an aspheric plane.

18. The optical pickup of claim 1, wherein said at least one photodetector comprises one photodetector that receives the laser beams originating from both said first and second light sources.

19. The optical pickup of claim 1, wherein said first light source generates a blue laser beam and said second light source generates a red laser beam.

20. The optical pickup of claim 19, wherein said first light source generates a laser beam having a wavelength of 405 nm and said second light source generates a laser beam having a wavelength of 650 nm.

21. The optical pickup of claim 20, wherein a substrate of the first medium has a thickness less than 0.6 mm, and a substrate of the second medium has a thickness of 0.6 mm.

22. The optical pickup of claim 1, wherein a substrate of the first medium has a thickness less than 0.6 mm, and a substrate of the second medium has a thickness of 0.6 mm.

23. An optical pickup for recording/reproducing on discs having different thicknesses, comprising:
light sources to generate light having different wavelengths, wherein the wavelengths correspond to respective different thicknesses of the discs;
an objective lens comprising a diverging portion having a negative power, wherein said objective lens focuses the light onto corresponding discs based upon the respective wavelengths;
at least one photodetector to receive the light reflected from the discs; and
a collimating lens arranged on an optical path between said objective lens, and said light sources.

24. The optical pickup of claim 23, wherein said objective lens further comprises a focusing portion.

25. The optical pickup of claim 23, wherein said objective lens further comprises a surface comprising an aspheric plane.

26. An optical pickup for recording/reproducing on discs having different thicknesses, comprising:
light sources to generate light having different wavelengths, wherein the wavelengths correspond to respective different thicknesses of the discs;
an objective lens comprising a diverging portion, wherein said objective lens focuses the light onto corresponding discs based upon the respective wavelengths;
at least one photodetector to receive the light reflected from the discs; and
a collimating lens arranged on an optical path between said objective lens, and said light sources,
wherein said objective lens satisfies the following relationship:

$$-0.8<f/fn<0,$$

where
f is a focal length of said objective lens, and
fn is a focal length of the diverging portion.

27. An optical pickup for recording/reproducing on discs having different thicknesses, comprising:
light sources to generate light having different wavelengths, wherein the wavelengths correspond to respective different thicknesses of the discs;
an objective lens comprising a diverging portion, wherein said objective lens focuses the light onto corresponding discs based upon the respective wavelengths;
at least one photodetector to receive the light reflected from the discs; and
a collimating lens arranged on an optical path between said objective lens, and said light sources,
wherein said objective lens further comprises a focusing portion and satisfies the following relationship:

$$-0<1/(f1 \cdot v1)+1/(f2 \cdot v2)<0.005,$$

where
f1 and f2 are front focal lengths of the diverging and focusing portions, and
v1 and v2 are Abbe's numbers on a d-line of optical materials for the diverging and focusing portions.

28. An optical pickup for recording/reproducing on discs having different thicknesses, comprising:
light sources to generate light having different wavelengths, wherein the wavelengths correspond to respective different thicknesses of the discs;
an objective lens comprising a diverging portion, wherein said objective lens focuses the light onto corresponding discs based upon the respective wavelengths;

at least one photodetector to receive the light reflected from the discs; and a collimating lens arranged on an optical path between said objective lens, and said light sources, wherein:
said objective lens further comprises a surface comprising an aspheric plane, and
said objective lens satisfies the following relationship:

$$-0.8 < f/fn < 0,$$

where
f is a focal length of said objective lens, and
fn is a focal length of the diverging portion.

29. The optical pickup of claim 28, wherein said at least one photodetector comprises one photodetector, wherein said one photodetector receives the light reflected from the discs.

30. The optical pickup of claim 29, further comprising a beam splitter disposed in an optical path between said collimating lens and said light sources, wherein said beam splitter reflects the light reflected from the discs to said one photodetector, and transmits the light from said light sources to said collimating lens.

31. The optical pickup of claim 28, wherein said at least one photodetector comprises photodetectors, wherein each said photodetectors receives the light of a corresponding wavelength reflected from a respective disc.

32. The optical pickup of claim 31, further comprising beam splitters disposed in an optical path between said collimating lens and said light sources, wherein said beam splitter reflects the light of a corresponding wavelength reflected from a respective disc to the respective photodetector, and transmits the light from said light sources to said collimating lens.

33. An optical pickup for recording/reproducing on discs having different thicknesses, comprising:
light sources to generate light having different wavelengths, wherein the wavelengths correspond to respective different thicknesses of the discs;
an objective lens comprising a diverging portion, wherein said objective lens focuses the light onto corresponding discs based upon the respective wavelengths;
at least one photodetector to receive the light reflected from the discs;
a collimating lens arranged on an optical path between said objective lens, and said light sources; and
a wavelength selecting filter, wherein said wavelength selecting filter selectively controls a numerical aperture of said objective lens according to the respective wavelengths of the light.

34. The optical pickup of claim 33, wherein said wavelength selecting filter is disposed between said objective lens and said collimating lens, reduces the numerical aperture for red light, and transmits blue light.

35. An optical pickup for recording/reproducing on discs having different thicknesses, comprising:
light sources to generate light having different wavelengths, wherein the wavelengths correspond to respective different thicknesses of the discs;
an objective lens comprising a diverging portion, wherein said objective lens focuses the light onto corresponding discs based upon the respective wavelengths;
at least one photodetector to receive the light reflected from the discs; and
a collimating lens arranged on an optical path between said objective lens, and said light sources, wherein:
said objective lens further comprises a surface comprising an aspheric plane, and
the aspheric plane satisfies the following relationship:

$$z = \frac{ch^2}{1 + \sqrt{1-(1+k)c^2h^2}} + Ah^4 + Bh^6 + Ch^8 + Dh^{10} + Eh^{12} + Fh^{14}$$

where z is a depth from a vertex of the surface, h is a distance from an optical axis of the objective lens, c is a curvature, K is a conic coefficient, and A, B, C and D are aspheric coefficients.

36. An objective lens that selectively focuses incident light onto discs having different thicknesses, the objective lens comprising:
a diverging portion to divergently transmit light to a disc having a thickness,
wherein the objective lens selectively focuses the incident light onto the disc based upon the thickness of the disc and a respective wavelength of the incident light.

37. The objective lens of claim 36, wherein the objective lens satisfies the following relationship:

$$-0.8 < f/fn < 0,$$

where
f is a focal length of the objective lens, and
fn is a focal length of said diverging portion.

38. The objective lens of claim 36, wherein the objective lens further comprises a focusing portion to focus the incident light onto the disc.

39. The objective lens of claim 38, wherein the objective lens satisfies the following relationship:

$$0 < 1/(f1 \cdot v1) + 1/(f2 \cdot v2) < 0.005,$$

where
f1 and f2 are front focal lengths of said diverging and focusing portions, and
v1 and v2 are Abbe's numbers on a d-line of the optical materials for said diverging and focusing portions.

40. The objective lens of claim 36, wherein the objective lens further comprises a surface comprising an aspheric plane.

41. The objective lens of claim 40, wherein the aspheric plane satisfies the following relationship:

$$z = \frac{ch^2}{1 + \sqrt{1-(1+k)c^2h^2}} + Ah^4 + Bh^6 + Ch^8 + Dh^{10} + Eh^{12} + Fh^{14}$$

where z is a depth from a vertex of said surface, h is a distance from an optical axis of the objective lens, c is a curvature, K is a conic coefficient, and A, B, C and D are aspheric coefficients.

42. The objective lens of claim 40, wherein the objective lens satisfies the following relationship:

$$-0.8 < f/fn < 0,$$

where
f is a focal length of the objective lens, and
fn is a focal length of said diverging portion.

43. The objective lens of claim 42, wherein the objective lens further comprises a focusing portion to focus the incident light onto the disc.

44. The objective lens of claim 43, wherein the objective lens satisfies the following relationship:

$$0 < 1/(f1 \cdot v1) + 1/(f2 \cdot v2) < 0.005,$$

where
- f1 and f2 are front focal lengths of said diverging and focusing portions, and
- v1 and v2 are Abbe's numbers on a d-line of the optical materials for said diverging and focusing portions.

45. The objective lens of claim 36, wherein the objective lens comprises a doublet lens, wherein said doublet lens comprises a positive portion with a condensing power, and said diverging portion with a diverging power.

46. The objective lens of claim 45, wherein said diverging portion divergently transmits the light to said positive portion, and said positive portion focuses the divergently transmitted light to the disc.

47. The objective lens of claim 45, wherein said positive portion is disposed between said diverging portion and the disc.

* * * * *

UNITED STATES PATENT AND TRADEMARK OFFICE
CERTIFICATE OF CORRECTION

PATENT NO. : 6,590,851 B1  Page 1 of 1
DATED : July 8, 2003
INVENTOR(S) : Tae-Kyung Kim et al.

It is certified that error appears in the above-identified patent and that said Letters Patent is hereby corrected as shown below:

Column 9,
Line 34, change "am" to -- nm --.

Signed and Sealed this

Ninth Day of December, 2003

JAMES E. ROGAN
*Director of the United States Patent and Trademark Office*